Feb. 4, 1958 W. F. BILLINGSLEY 2,822,016
WHEEL, TIRE AND TRIM RING ASSEMBLY
Filed Nov. 4, 1955
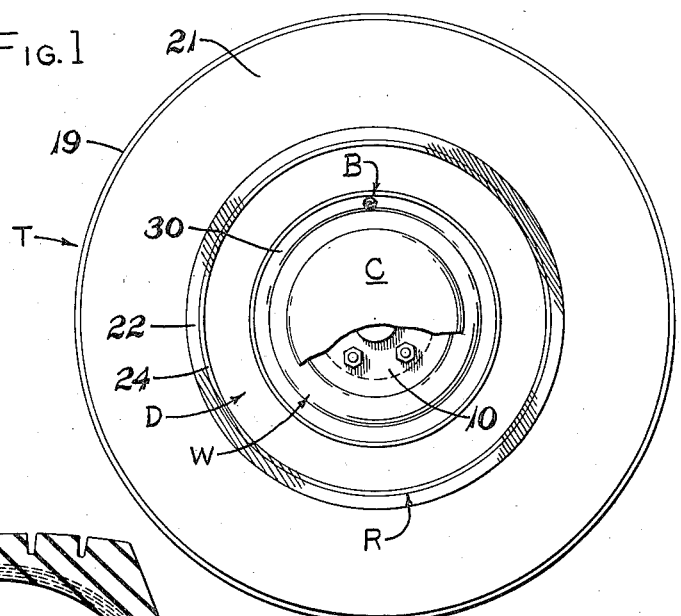
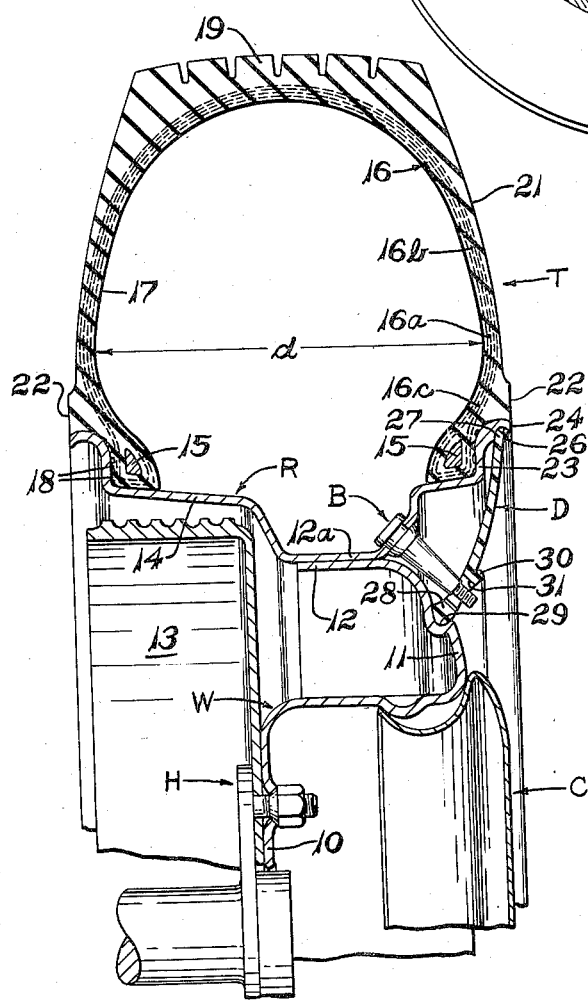
INVENTOR.
WILLIAM F. BILLINGSLEY
BY
C. E. Tripp
ATTY.

United States Patent Office 2,822,016
Patented Feb. 4, 1958

2,822,016

WHEEL, TIRE, AND TRIM RING ASSEMBLY

William F. Billingsley, Silver Lake, Ohio, assignor to The B. F. Goodrich Company, New York, N. Y., a corporation of New York Application November 4, 1955, Serial No. 544,891

2 Claims. (Cl. 152—352)

This invention relates to a combined wheel, pneumatic tire and trim ring assembly. There is a trend in automobile design and styling toward the production of cars that are low, and since there are practical limitations to this trend automobile designers are ever seeking for means to augment the low appearance of the vehicles without going to extremes in space limitations and chassis design. This trend has been accompanied by a trend toward smaller diameter wheels and tires but here, too, there are limitations relating to ride, stability and braking power which make it undesirable to reduce wheel, rim and tire diameters below certain dimensions for a vehicle of a given size. Tires are almost always provided with circumferential ribs, on at least the outer side of the side wall which have some function as curb guards and enhance the appearance of the tire. These ribs are customarily disposed a substantial radial distance away from the tire beads and are sometimes referred to as "buffing ribs" wherein the side wall portion of the tire radially inside of the rib is white, because the junction of the white (or other colored rubber) and the black rubber can be delineated at one side of the rib. It is a feature of this invention that advantage is taken of the fact that motorists are accustomed to the appearance of a wheel and tire assembly wherein there is a circumferential rib on the tire sidewall intermediate the rim flange and the tire tread to provide a wheel, tire and ornamental trim ring assembly that gives the appearance of a large section tire mounted on a small diameter wheel thereby improving the low appearance and styling of the vehicle. In one embodiment of the invention this advantage is attained by disposing the circumferential tire rib close to the tire bead so that radially inner edge of the tire rib fits against the periphery of the outer rim flange. An ornamental wheel trim ring is provided that extends from a zone adjacent the tire rib to a radially inner zone on the wheel and the inner portion of the trim ring bears a reinforcement that assists in holding the trim ring in place and simulates a rim flange, the result being an assembly having the appearance of a large section tire mounted on a small diameter wheel.

There has also been a trend toward white sidewall tires, particularly as original equipment on new cars. The white sidewall (or other colored) portion is customarily that part of the tire sidewall disposed radially inwardly of the rib, which rib usually serves as a buffing rib and must be partially ground or abraded (buffed) away to eliminate white and black rubber overlap in order to provide clean delineation of colors. With this invention, if a white sidewall (or other colored sidewall) effect is desired the trim ring need only be made of white rubber (for example) and the desired effect is attained. This gives three advantages. First, the tire sidewall is made of all black rubber; second, the rib need not be buffed; and third, the tire rim and rim edge act as a positive guard or curb deflector to prevent marring or cutting the white trim ring. This last feature eliminates one of the problems encountered by motorists using conventional white sidewall tires. Not only is the white sidewall easily marked, but it is made of a rubber having less resistance to damage than carbon black rubber, and is disposed on the tire so as to be vulnerable to damage from curbs and the like. Should the white trim ring of this invention be damaged it can be replaced at a relatively low cost, but if the white sidewall of a tire is damaged, the cost of repair or replacement is usually prohibitive.

According to this invention a wheel, tire and ornamental trim ring assembly is provided that gives the appearance of a relatively large section tire mounted on a relatively small diameter wheel and the invention is very useful in assemblies where the effect of a white sidewall tire is desired. This invention is related to my copending application Serial No. 544,892, filed November 4, 1955, assigned to The B. F. Goodrich Company but differs therefrom in an important respect in that in my aforesaid related application, a specially formed tire and rim are employed whereas in this application quite similar results are attained with a conventional tire and rim assembled with trim ring constructed and retained as will be described briefly.

Referring to the drawings, Fig. 1 is a plan view of the wheel and tire assembly embodying the invention. Fig. 2 is a fragmentary sectional view of the same assembly. In the assembly, the wheel W has a central portion as at 10 by which it is mounted to the hub and brake drum assembly H. The wheel is formed of a metal stamping and is dished axially outwardly as at 11, there being a peripheral mounting flange 12 welded to the well 12a of tire drop center rim R. The rim R has its well off-set to the outer side so that brake drum 13 nests within the axially inner bead seat as is current general practice. This permits the use of relatively larger brake drums than would be possible if the brake drum fitted inside the rim well. The tire T has the usual wire bead grommets 15, carcass plies 16 and an air-impervious liner 17 which coupled with the sealing ribs 18 provide an air tight enclosure in a manner now well known in the tubeless tire art. This invention is not limited to the use of tubeless tires, however, it is equally suitable for tires used with inner tubes. The tire is also provided with a tread 19 and has a sidewall covering 21 which is formed of carbon black rubber such as tread stock, the color of such rubber being black. Close to the beads of the tire are disposed circumferential ribs 22.

As mentioned, it has been customary to provide circumferential ribs on tire sidewalls intermediate the tire beads and the tread to serve as buffing ribs to assist in delineating sharply the two colors of the sidewall. In accordance with this invention, the curbguard or buffing ribs 22 are not placed a substantial radial distance outwardly of the tire beads as is customary, but rather the ribs 22 are formed close to the tire beads so as to abut the outer rim flange 23, and the axially outer edge 24 of the rim flange is formed as a flat surface which forms a continuation of the outer surface of the adjacent tire rib 22. The ribs 22 are best made of sidewall rubber (black) with which the edge 24 of the rim flange will be painted black to match. If the tire rib 22 and the edge 24 of the rim flange are of the same color and the rim flange edge is virtually not noticeable and the rim flange edge and tire rib merge to give the appearance of a single circumferential rib. The outer rim flange 23 is formed to provide a groove 26 that faces radially inwardly and receives by snap fit one lip 27 of an ornamental trim ring D colored some other color than the black color characteristic of the carbon black rubber forming the tread and outer sidewall. The most common color, for example, in a two color sidewall tire is white. The radially inner lip rib 28 of the ring D nests in a groove 29 formed into the dished-part of wheel W. In order to stiffen and augment the mounting of ring D, the ring is reinforced as at 30 by a thickened structure formed to simulate the side flange of a tire rim. Thus in an assembly where trim ring D is colored white, the entire assembly appears to be that of a large section white sidewall tire mounted on a small diameter wheel and rim assembly with the buffing or curb guard rib disposed in its accustomed position substantially midway between the rim and the tire tread. Of course, a suitable inflation valve B is mounted on the rim and extends through an aperture 31 in the disk D for access and inflation, and a suitable hub cap C is mounted to conceal the mounting bolts.

The trim ring D is preferably formed of pigmented rubber or plastic material such as pigmented polyvinyl chloride, particularly where the reinforcing, simulated rim flange is formed on the ring. The pigments may be titanium oxide for whiteness and magnesium carbonate as a filler, in accordance with known compounding practice. The reinforcement 30 that simulates a rim flange may be colored differently from the remainder outside surface of the trim ring.

The geometry of the assembly of this invention is an important feature from a mechanical appearance, and protective standpoint. First in accordance with principles now known to those skilled in the tire art in order for air pressure to retain the tire beads on the rim, the carcass plies 16 have their maximum axial dimension (*d*) across the tire at 16*a*, intermediate the beads and the tread, and the plies curve axially inwardly toward the tread as at 16*b*, and axially inwardly toward the beads as at 16*c*. This construction assures air pressure retention of the beads on the rim but is incompatible with some desired features of the invention. However, rib 22 is axially thick and disposed just radially inwardly of the maximum section portion 16*a* of the carcass and runs to the rim flange, giving an appearance of an assembly of a tire without the usual belly and with a rib forming the major width disposed at the rim. Thus the rib and rim act as a very effective guard and the conventional appearance of a bellied tire is attained by the disposition of the trim ring which curves axially inwardly from a zone adjacent the rib to the wheel and which, with the visible portion of tire sidewall 21 forms a convex curve (in section) interrupted by a guard rib at the apex of the curve.

Another advantage of the invention is that the tire rib and rim flange edge act to buttress the tire carcass itself at one of its vulnerable areas where it is subject to bruising and damage from curbs, stones and the like. Also, since the ring is not subject to flexing in use it can be made of economical material such as zinc oxide reinforced rubber without danger of cracking.

Since tires can be mounted with either sidewall facing outwardly it is not necessary under this invention to have the specially placed and formed buffing rib 22 formed on both sides of the tire to attain the desired effect, but obviously if the special rib 22 is formed on both tire sidewalls the tire can be mounted with either sidewall to the outside.

Having completed a detailed description of a preferred embodiment of my invention, I claim:

1. In combination, a vehicle wheel having a central generally radial attachment portion, an axially outwardly dished outer portion, and a rim connected to said outer portion having bead seats and tire retaining side flanges; a pneumatic tire having axially spaced beads seated on said rim, curved sidewalls and a tread bridging the sidewalls, reinforcing material in said tire extending from bead to bead, the major axial dimension of said reinforcing material across the tire occurring intermediate the beads and the tread, a relatively thick circumferential rib formed on one side of said tire and disposed radially inwardly of the major axial dimension of said reinforcing material, said rib projecting axially from the associated curved sidewall, said rib forming a generally radial continuation of the edge of the corresponding rim side flange; and a trim ring on said wheel having its outer edge radially adjacent the edge of said rim side flange but disposed axially inwardly therefrom, and its inner edge engaging the wheel, said trim ring curving axially inwardly from its outer to its inner edges, said trim ring and the tire sidewall portion outside of said rim cooperating to form a convex curve interrupted by said rib and rim flange edge, the projection of said rib and rim flange edge axially outwardly past said curve to act as a guard for the sidewall and trim ring, the radially inner portion of said trim ring being thickened for reinforcement radially outwardly of its inner periphery forming a flange portion that resembles a rim side flange.

2. In combination, a vehicle wheel having a central generally radial attachment portion, an axially outwardly dished outer portion, and a rim connected to said outer portion having bead seats and side tire retaining flanges; a pneumatic tire having curved side walls and beads seated on said rim, a circumferential rib formed on one side of said tire said rib projecting axially from the associated curved sidewall, said rib forming a generally radial continuation of the edge of the corresponding rim side flange, a radially inwardly facing annular groove formed in said rim side flange just axially within said edge of the flange, an opposing annular groove formed in said outwardly dished wheel portion disposed axially inwardly of said rim flange groove; and a trim ring having its inner and outer peripheral edges respectively nested in said grooves; said trim ring curving axially inwardly from said rim side flange to give the appearance of a tire side wall, the radially inner portion of said trim ring being thickened for reinforcement radially outwardly of its inner periphery forming a flange portion that resembles a rim side flange.

References Cited in the file of this patent

UNITED STATES PATENTS

| | | |
|---|---|---|
| 1,969,088 | Maranville | Aug. 7, 1934 |
| 2,148,995 | Nelson | Feb. 28, 1939 |
| 2,440,804 | Lyon | May 4, 1948 |